United States Patent

Suda

[11] Patent Number: 5,892,578
[45] Date of Patent: Apr. 6, 1999

[54] FOCUS DETECTION DEVICE

[75] Inventor: Yasuo Suda, Yokohama, Japan

[73] Assignee: Canon Kabushiki Kaisha, Tokyo, Japan

[21] Appl. No.: 71,693

[22] Filed: May 1, 1998

[30] Foreign Application Priority Data

May 12, 1997 [JP] Japan .................................. 9-121013

[51] Int. Cl.$^6$ ............................... G01J 1/00; G03B 13/36

[52] U.S. Cl. ........................................... 356/123; 396/128

[58] Field of Search .......................... 356/123; 396/128; 348/246, 247; 354/406, 407, 408, 409, 403, 404; 250/201, 204, 209, 578

[56] References Cited

U.S. PATENT DOCUMENTS

| | | | |
|---|---|---|---|
| 4,329,577 | 5/1982 | Asano et al. | 250/201 |
| 4,698,492 | 10/1987 | Ohtaka et al. | 250/201 |
| 5,087,935 | 2/1992 | Kaneda et al. | 354/403 |
| 5,155,518 | 10/1992 | Utagawa | 354/407 |
| 5,615,399 | 3/1997 | Akashi et al. | 396/128 |
| 5,659,816 | 8/1997 | Uchiyama | 396/124 |

Primary Examiner—Frank G. Font
Assistant Examiner—Michael P. Stafira
Attorney, Agent, or Firm—Robin, Blecker & Daley

[57] ABSTRACT

The invention relates to a multipoint focus detection device and is to provide a device which determines a sampling point of an output of a sensor in accordance with a movement speed distribution of an image on the sensor and carries out an appropriate process in case that the movement speed is different.

13 Claims, 11 Drawing Sheets

FOCUS DETECTION DEVICE

BACKGROUND OF THE INVENTION

1. Field of the Invention

This invention relates to a focus detection device for use in a Camera or the like which uses a light beam transmitted through an imaging optical system to detect the imaged state thereof.

2. Related Background Art

In a focus detection device of the phase difference detection type, a method of correcting the distortion of the distribution of the quantity of light projected onto a photo-electric conversion element by calculating the output of the photoelectric conversion element is disclosed, for example, in Japanese Patent Application Laid-Open No. 62-173412. This example discloses a calculating method which relates distortion occurring to a secondary object image to a corrected image, and processes an image signal after A/D-converted by a predetermined calculating method shown in this publication, and returns the distortion to its original state, whereby it can accurately effect the determination of the in-focus of an objective lens.

However, depending on an optical system adopted in the focus detection device, there is a case where the movement speed of the image resulting from the defocus of the objective lens differs depending on the position on a focus detection area and as the result, the detection of the defocus amount is not accurately effected. Accordingly, accurate focus detection cannot be accomplished simply by correcting distortion by the method as described above.

SUMMARY OF THE INVENTION

One aspect of the application is to provide, in view of the above-noted situation, a focus detection device which is provided with light receiving means comprising a plurality of photoelectric conversion elements, and signal processing means, and in which a pair of object images having a parallax are projected onto the light receiving means to thereby form a focus detection field of view for detecting the focus state of an objective lens, and detect the focus position of the objective lens by the relative positional relation between the pair of object images, wherein the signal processing means is adapted to correct the outputs of the photoelectric conversion elements on the basis of the distribution of the parallax on the focus detection field of view, and even if the movement speeds of the images differ from each other on the light receiving means, a state in which sampling in a state in which the pitch is great has been effected as the pixel of the element at a position whereat the movement speed is apparently high is formed, and conversely a state in which sampling in a state in which the pitch is small has been effected as the pixel of the element at a position whereat the movement speed is low is formed by a calculating process.

One aspect of the application is to provide a focus detection device which is provided with an optical system for causing a pair of images from different positions in a scene to be received on light receiving means comprising a plurality of photoelectric conversion elements with a parallax conforming to each of the positions and in which the sampling point of the photoelectric conversion elements is determined on the basis of the distribution of the parallax at each of the points on the light receiving means to thereby deal with the problem of the movement speed of the images.

One aspect of the application is to provide a focus detection device which is provided with an imaging optical system for re-forming the primary object image of a light beam passed through an objective lens, and light receiving means comprising a plurality of photoelectric conversion elements for receiving a pair of secondary object images having a parallax from the imaging optical system, and in which for different positions in a scene, each pair of secondary object images are caused to be received on the light receiving means to detect the focus state of an area by the relative positional relation between each pair of secondary object images, wherein in order to correct the difference for each area in the movement speed of the images resulting from the defocus on the light receiving means caused by the difference between the parallaxes for the respective positions in the scene, the sampling pitches of the outputs of the photoelectric conversion elements are made to differ from one another in conformity with the distribution of the movement speed to thereby deal with the problem of the movement speed of the images.

Other objects of the present invention will become apparent from the following detailed description of an embodiment of the invention taken in conjunction with the accompanying drawings.

DESCRIPTION OF THE PREFERRED EMBODIMENT

Figure 6:
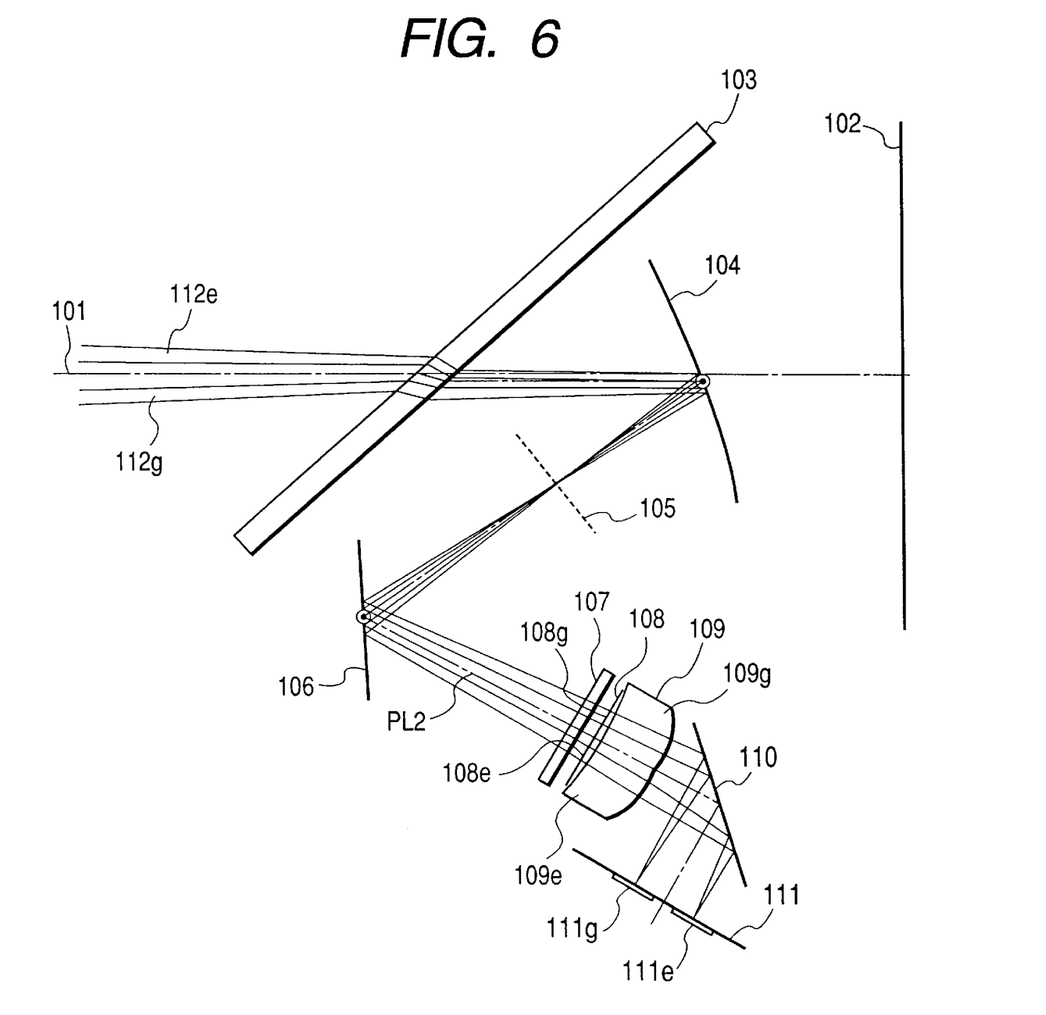
FIG. 6 shows a focus detection optical system in the focus detection device according to the present invention.
Figure 7:
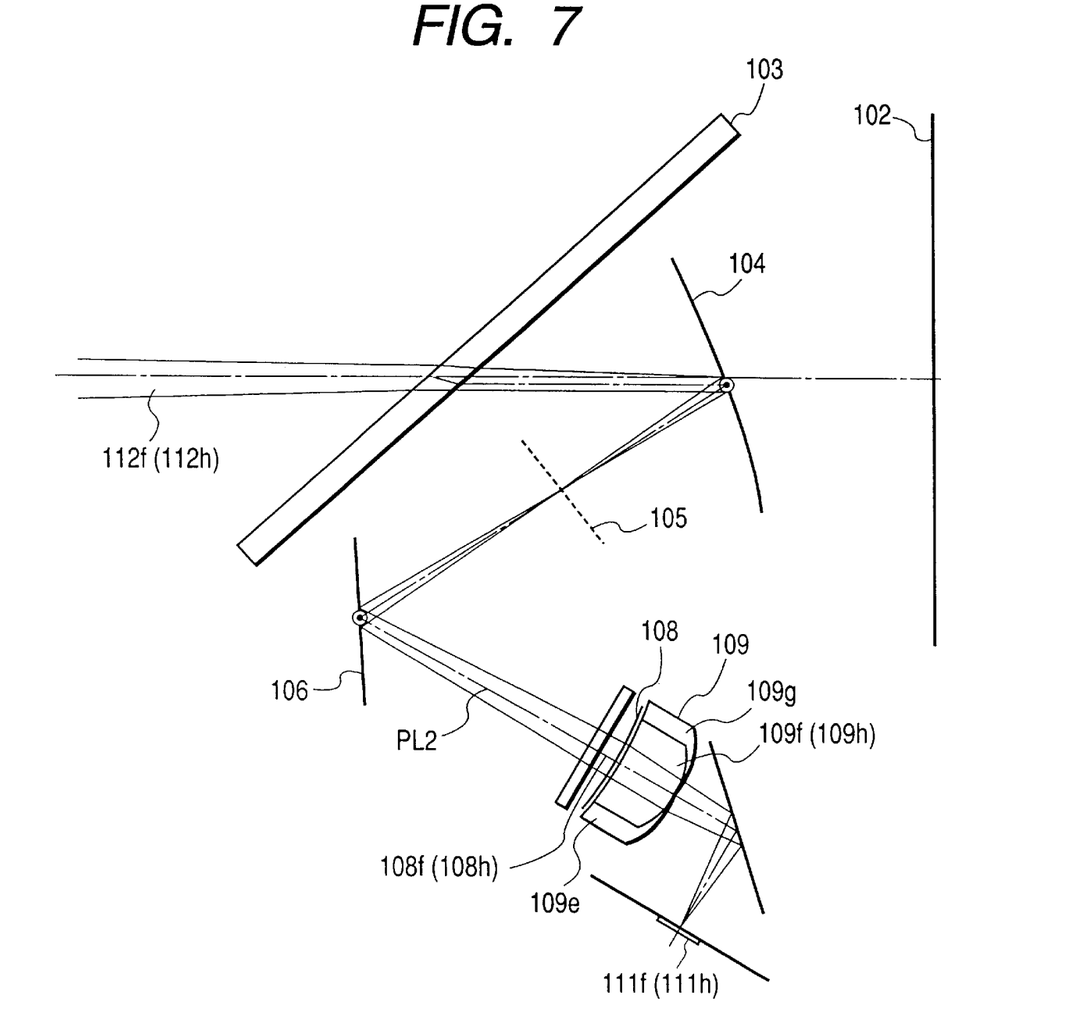
FIG. 7 shows the focus detection optical system in the focus detection device according to the present invention with FIG. 6.

FIGS. 6 and 7 show the focus detection optical system of the present invention. The focus detection device has a detection system for longitudinally separating the pupil of an objective lens, and a detection system for laterally separating the pupil of the objective lens, and FIG. 6 shows the optical path of the former as it is projected onto a plane containing the optical axis of the objective lens, and FIG. 7 shows the optical path of the latter as it is projected onto the plane containing the optical axis of the objective lens.

In FIGS. 6 and 7, the reference numeral 101 designates the optical axis of an objective lens, not shown, the reference numeral 102 denotes an image pickup surface, the reference numeral 103 designates a main mirror disposed on the optical axis 101 of the objective lens and having a semi-transmitting area in the central portion thereof, the reference numeral 104 denotes a first reflecting mirror obliquely disposed on the optical axis of the objective lens, the reference numeral 105 designates a paraxial imaging plane conjugate with the image pickup surface 102 turned back by the first reflecting mirror 104, the reference numeral 106 denotes a second reflecting mirror, the reference numeral 107 designates an infrared ray cut filter, the reference numeral 108 denotes a stop having four opening portions, the reference numeral 109 designates a re-imaging lens block having four lens portions correspondingly to the opening portions of the stop, the reference numeral 110 denotes a third reflecting mirror, and the reference numeral 111 designates an area sensor having two pairs of two-dimensional type light receiving areas. Each light-receiving area is comprised of a plurality of sensor arrays comprising a number of pixels having the same opening, and the sensor arrays also form a pair. The first reflecting mirror 104 is an elliptical mirror, and two focuses defining the ellipse are located on a line along which an optical path after a ray of light on the optical axis 101 of the objective lens has been refracted by the main mirror 103 is conversely extended toward the objective lens side.

The first reflecting mirror serves also as a field mask for limiting the focus detection area and therefore, only the necessary area thereof is adapted to reflect. The second reflecting mirror 106 and the third reflecting mirror 110 are plane mirrors. Of these constituents, the optically functioning portions are all constructed symmetrically with respect to the planes of the drawing sheets of FIGS. 6 and 7.

Figure 8:
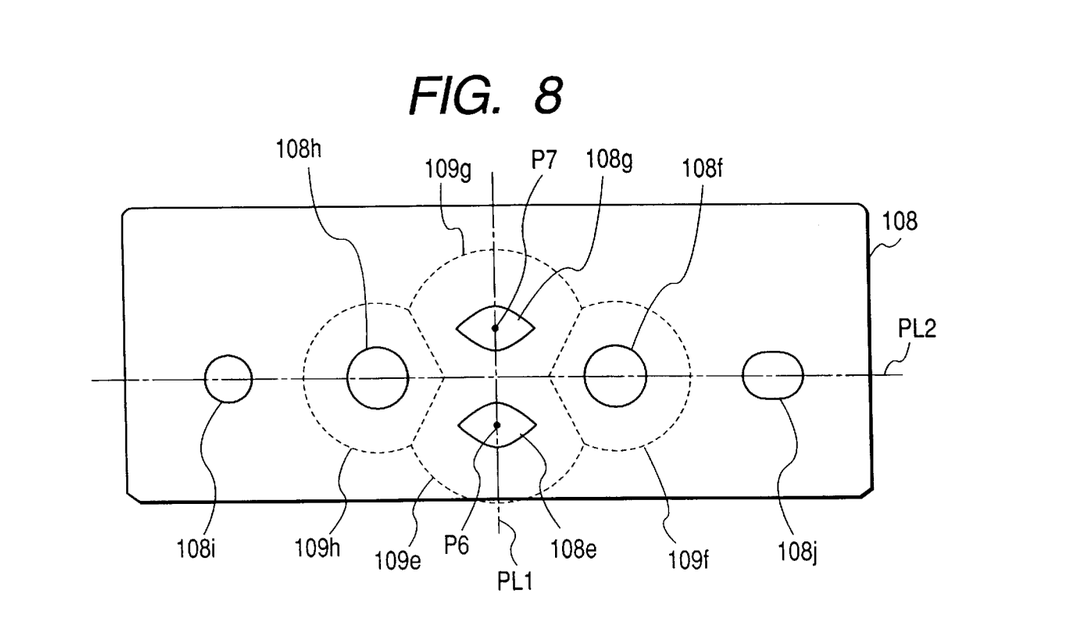
FIG. 8 is a plan view of a stop 108 shown in FIGS. 6 and 7.

FIG. 8 is a plan view of the stop 108. The stop 108 comprises a light-intercepting thin plate made of a metal or resin. In FIG. 8, the reference characters 108e to 108h designate stop opening portion, and the reference characters 108i and 108j denote positioning apertures. The stop 108 is fixed to the re-imaging lens block 109 through the positioning apertures 108i and 108j.

The light incidence side of the re-imaging lens block 109 is a single concave spherical surface having its center on the optical axis of the objective lens deflected by the first reflecting mirror, and the emergence side thereof is two pairs of convex lenses 109e to 109h eccentric in opposite directions. Further, the center of the concave spherical surface is located on the paraxial imaging plane 105 of the objective lens formed by the first reflecting mirror 104, and the centers of the two pairs of lens portions 109e to 109h are substantially located near said stop openings. By disposing the power of the lens in such a form, highly accurate focus detection over a wide wavelength range is possible.

The positional relation between the stop 108 and the re-imaging lens block 109 is set such that the two pairs of lenses 109e to 109h are located behind the stop 108 as indicated by broken lines in FIG. 8. The opening centroids of the stop openings 108e and 108g are on a first plane PL1 parallel to the optical path near the optical axis of the objective lens and containing the curvature centers P6 and P7 of the lens portions 109e and 109g, respectively, and the opening centroids of the stop openings 108f and 108h and the curvature centers of the lens portions 109f and 109h are on a second plane PL2 containing the optical path near the optical axis of the objective lens and orthogonal to the first plane PL1.

As the optical path of a focus detection light beam, those of the stop opening portions and the lens portions which are designated by the same suffixes correspond to each other, and a light beam passed through each opening portion forms a secondary object image on the area sensor 111 through a third reflecting plate. Light beams passed through the elements designated by different suffixes do not arrive at a predetermined position on the area sensor and therefore do not contribute to focus detection. The detection system using light beams passing through the elements designated by suffixes e and g longitudinally separates the exit pupil of the objective. lens, while the detection system using light beams passing through the elements designated by suffixes f and h laterally separates the exist pupil of the objective lens. Hereinafter, the detection system which longitudinally separates the pupil will be called the first focus detection system, and the detection system which laterally separates the pupil will be called the second focus detection system.

The optical action in the above-described construction will now be described.

The reference characters 112e, 112g, 112f and 112h indicated in FIGS. 6 and 7 designate light beams to the center of the image field through the stop 108, used for focus detection. Describing the order in which these light beams travel, the light beam from the objective lens, not shown, is first transmitted through the main mirror 103, whereafter it is reflected in a direction substantially along the inclination of the main mirror 103 by the first reflecting mirror 104. The first reflecting mirror 104 is an elliptical mirror as previously described, and can place two focuses substantially in a projection relation.

Here, one focus is set at the optical equivalent point of the representative exit pupil position of the objective lens, and the other focus is set at the optical equivalent point of the stop 108, and is endowed with the function as a field lens. The representative exit pupil position of this objective lens is a tentative pupil position inherent to the focus detection system generally determined with the conditions of the exit windows of various photo-taking lenses mounted on a Camera taken into account.

The light beam reflected by the first reflecting mirror 104 is again reflected by the second reflecting mirror 106, and enters the infrared ray cut filter 7. Infrared rays which become the factor for reducing the accuracy of focus detection are removed here, and only the light of a wavelength range in which the aberration correction of the objective lens has been sufficiently done arrives at the stop 108 placed behind it and the re-imaging lens block 109.

Figure 9:
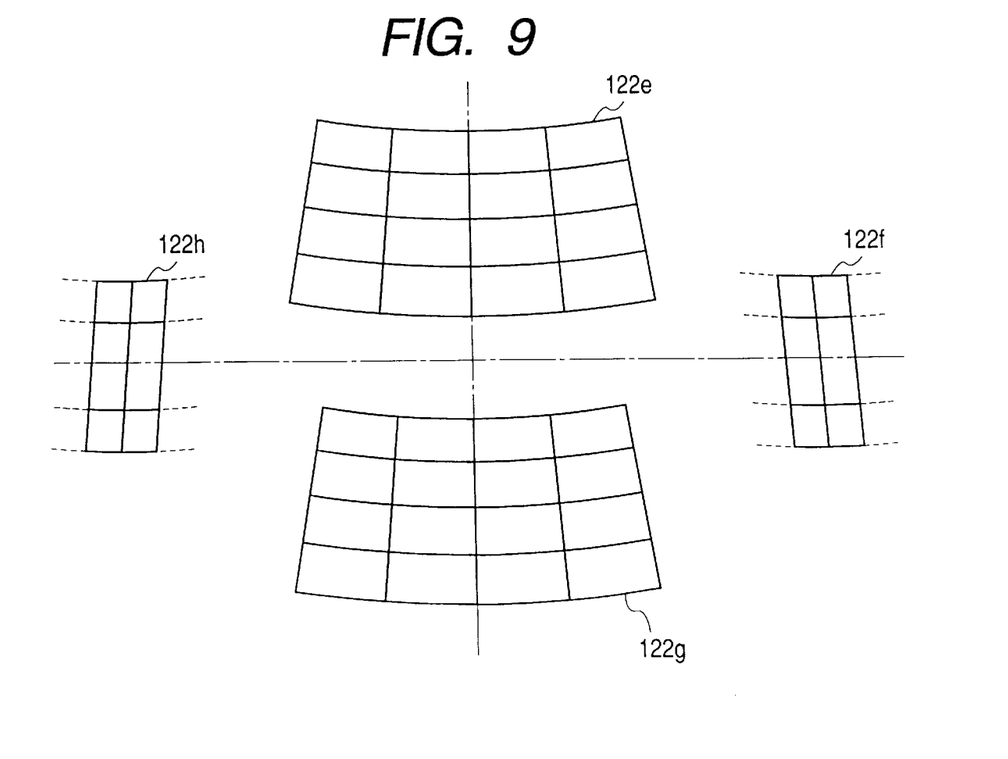
FIG. 9 shows the state of secondary object images on an area sensor shown in FIGS. 6 and 7.

The light beam converged by the action of the re-imaging lens block 109 forms a secondary object image on the area sensor 111 through a third reflecting mirror. FIG. 9 shows the state of the secondary object image on the area sensor, and it is an example of a grating-like object. Four secondary object images are formed by the four lenses of the re-imaging lens block 109, and 122g, 122e and 122f, 122h become pairs of images between which the relative positional relation should be detected. Here, the spacing between the opening portions 108e and 108g of the stop 108 and the spacing between the opening portions 108f and 108h of the stop 108 differ from each other, and the second focus detection system in which the spacing is wider becomes more sensitive to the movement of the secondary object image and therefore, highly accurate focus detection is possible.

The range in which an object is projected differs between secondary object images 122g, 122e and secondary object images 122f, 122h, and becomes an area determined by the size of the first reflecting mirror for the secondary object images 122g and 122e, and becomes an area through which a ray of light can pass on the main mirror 103 and the second reflecting mirror for the secondary object images 122f and 122h from the difference in the spacing between the stop opening portions thereof, and becomes narrower than the secondary object images 122g and 122e. Also, due to the fact that the first reflecting mirror 104 is obliquely disposed, considerably great distortion free of axisymmetry is created in each image.

However, even when such distortion is present, if the following two conditions are satisfied, there will be no problem as a focus detection device for a camera which particularly requires quick focusing. The two conditions are that in order to obtain accurate in-focus determination, (1) when at least the objective lens is in focus, secondary object images corresponding to the same position on the object are projected on a pair of sensor arrays to be detected, that is, the difference between the magnifications of the two images is small in a direction orthogonal to the sensor array, and that in order to obtain accurate defocus detection, (2) when the defocus of the objective lens has occurred, secondary object images corresponding to the same position on the object are projected on the pair of sensor arrays to be detected, with a positional phase difference.

Figure 11:
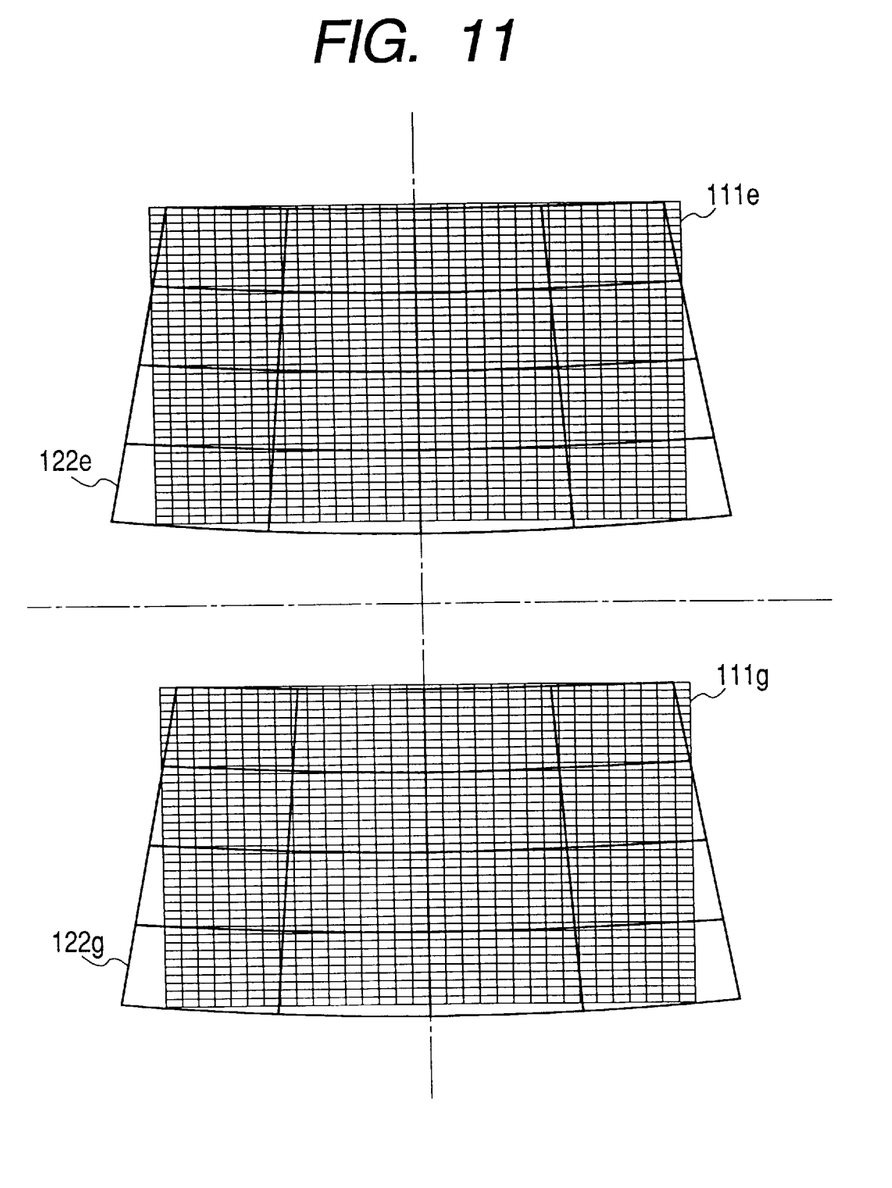
FIG. 11 is a view for illustrating the manner of photo-electric conversion of the secondary object images by the sensor array shown in FIGS. 6 and 7.

Now, from such a point of view, the image and sensors of this focus detection system will be described. First, regarding the first focus detection system for longitudinally separating the pupil, the inclination of the first reflecting mirror 104 is in the plane of the drawing sheet of FIG. 6 coincident with the direction of separation of the pupil and therefore, with regard to both of the secondary object images 122g and 122e, the distortion becomes a sectural shape symmetrical with respect to this plane, and the distortion itself is considerably great. However, the difference in distortion between the two images is slight and particularly, there is little or no image magnification difference in the lateral direction in FIG. 6 corresponding to a direction orthogonal to the separation of the pupil. Accordingly, if the light receiving areas and the sensor arrays are disposed as shown in FIG. 11, an object image forming a pair with the object image projected onto any sensor array on one light receiving area is projected onto a corresponding sensor array on the other light receiving area. That is, the above-mentioned condition (1) is satisfied.

Figure 10:
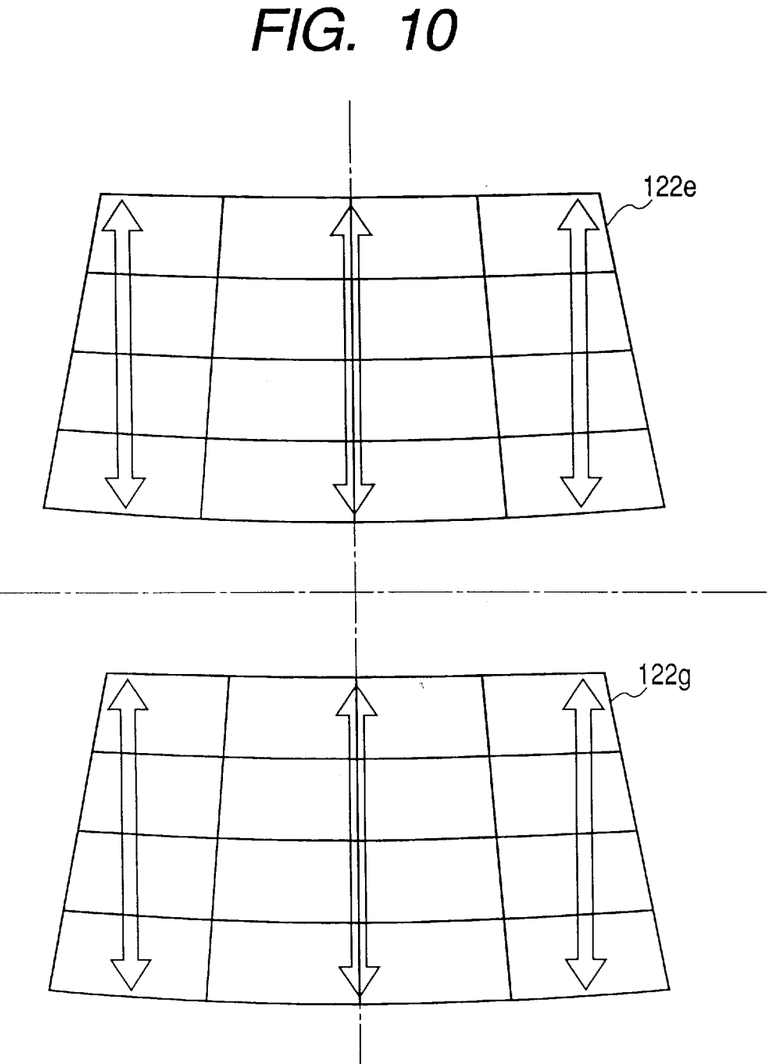
FIG. 10 shows the direction of movement of the secondary object images on the area sensor shown in FIGS. 6 and 7.

Also, the factor of the distortion of the secondary object images resides in the first reflecting mirror 104, i.e., the pupil projection optical system, and it can be said that the distortion created on the paraxial imaging plane 105 of the first reflecting mirror 104 is intactly projected onto the area sensor 111 by the re-imaging lens block 109. Accordingly, the direction of movement of the secondary object images is the direction of arrangement of the stop opening portions 108e and 108f, and on the area sensor, the direction of arrow indicated in FIG. 10. Accordingly, by the sensor arrays being set as described above, the condition (2) is also satisfied at the same time, whereby it is possible to compare the relative positional relation between the secondary object images, and find the defocus amount of the objective lens.

Figure 13:
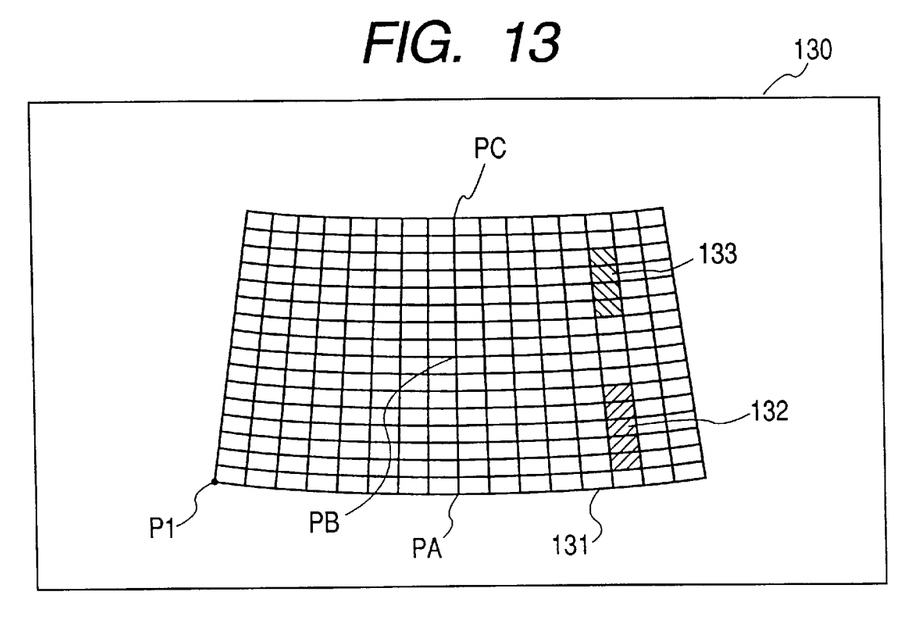
FIG. 13 shows a focus detection area on an image pickup surface.

FIG. 13 shows the focus detection area on the image pickup surface by the light receiving areas thus disposed. Since the secondary object images having distortion are photoelectrically converted by the light receiving areas 111g and 111e arranged in a rectangular shape, the focus detection area 103 becomes distorted in the image pickup surface 130 as shown.

Description will now be made of the second focus detection system for laterally separating the pupil. It is now in only an area near the central portion of the image pickup surface that the image magnification difference between the two images becomes small in a direction orthogonal to the separation of the pupil. So, if the light receiving areas are limited to only this position, the object image forming a pair with the. object image projected onto any sensor array on one light receiving area is projected onto a corresponding sensor array on the other light receiving area and thus, the above-mentioned condition (1) is satisfied.

Figure 12:
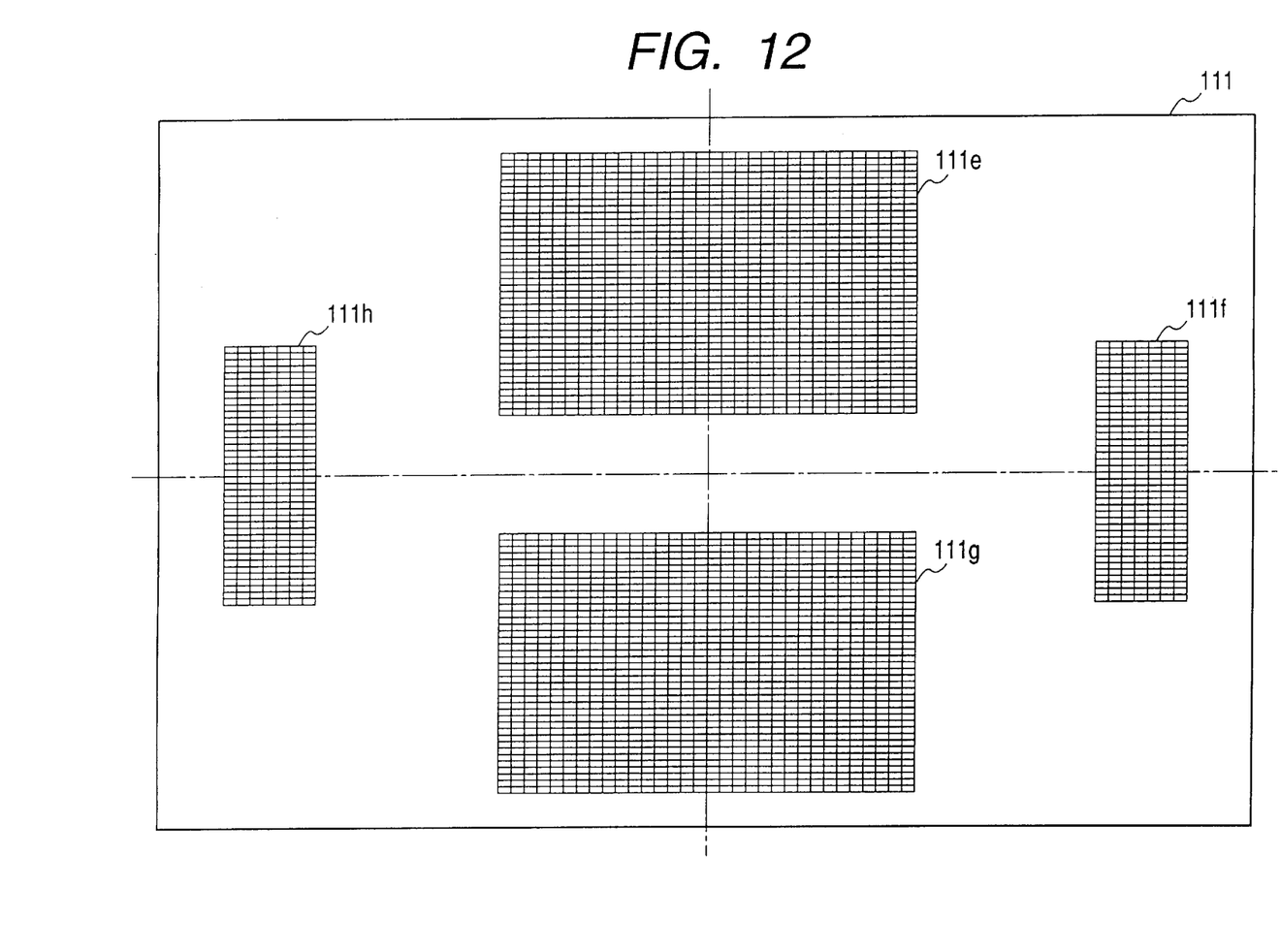
FIG. 12 is a plan view of the area sensor shown in FIGS. 6 and 7.
Figure 14:
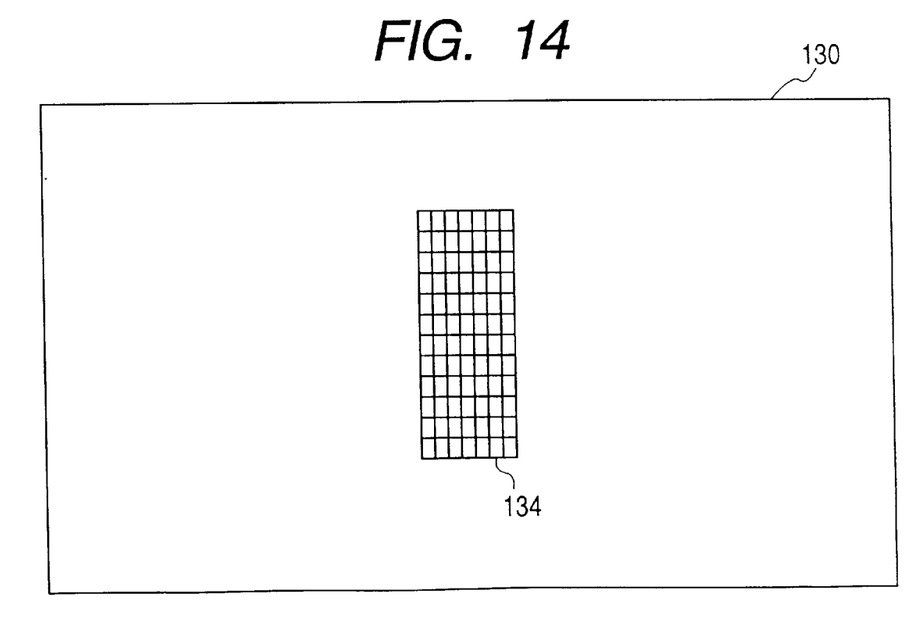
FIG. 14 shows a focus detection area on the image pickup surface.

FIG. 12 is a plan view of the area sensors in which the light receiving areas 111f and 111h for the second focus detection system are depicted in addition to the light receiving areas 111g and 111e of the first focus detection system shown in FIG. 11. The direction of movement of the secondary object images 122f and 122h forming a pair is the direction of arrangement of the stop opening portions 108f and 108h for a reason similar to that for the first focus detection system, and by the sensor arrays being set as shown, the condition (2) can also be already satisfied. The focus detection area on the image pickup surface by such light receiving areas is as shown in FIG. 14, and the focus detection area 134 is the central portion of the image pickup surface 130.

By the use of such an area sensor 111, the distribution of the quantity of light is taken out as an electrical signal and the relative positional relation between the images on the pair of sensor arrays to be detected is detected, whereby it is possible to detect the focus position of the objective lens. If in this case, the pair of sensor arrays to be detected are suitably selected, a two-dimensional imaged state can be detected on the image pickup surface. Also, as indicated by 132 and 133 in FIG. 13, it is possible to make a defocus map on the image pickup surface from the focus information of a more subdivided focus point obtained by the sensor array being divided into a plurality of areas, and automatically control the focus of the objective lens at the most appropriate position in a main object.

Figure 1:
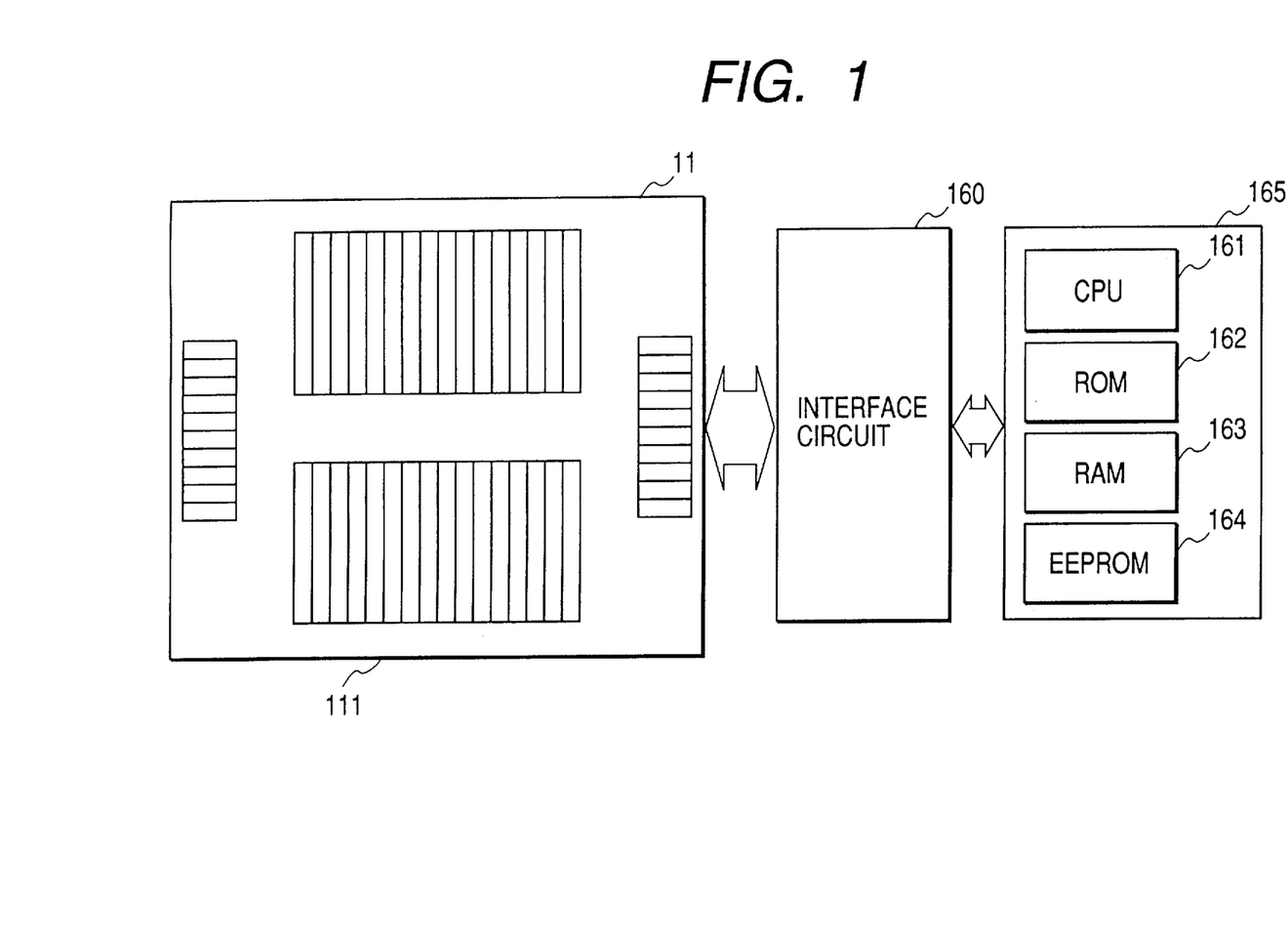
FIG. 1 is a block diagram showing the circuit construction of a focus detection device according to the present invention.

FIG. 1 is a block diagram showing the circuit construction of the focus detection device. An interface circuit 160 is connected to the area sensor 111, and the interface circuit 160 is further connected to a microcomputer 165 which is a processing device. The area designation in the light receiving area of the area sensor 111 used for focus detection and the accumulation control of photon charge are effected by the microcomputer 165. The microcomputer 165 has a CPU (central processing unit) 161, a ROM 162, a RAM 163 and an EEPROM (electrically erasable programmable ROM) 164, and executes the focus detection processing operation in accordance with a program stored in the ROM 162. Also, the optical information of the focus detection optical system is pre-stored in the EEPROM 164 by a regulating stroke or the like.

Figure 2:
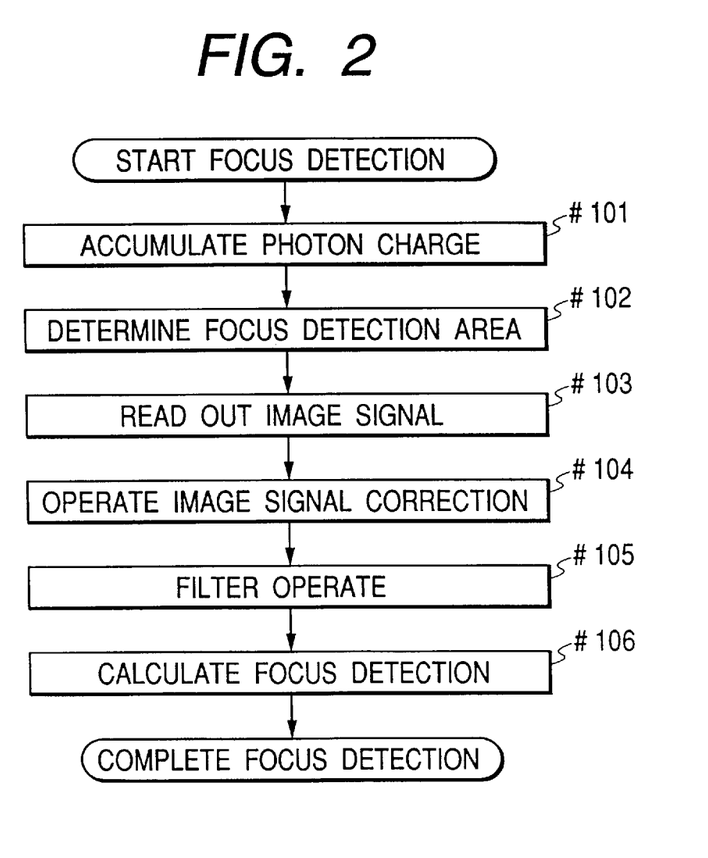
FIG. 2 is a flow chart of a focus detecting process program in the focus detection device according to the present invention.

FIG. 2 is a flow chart of a focus detection processing program stored in the ROM. When the microcomputer starts the focus detection process, the area sensor 111 is first instructed to effect the accumulation of photon charge at a step #101. At this time, the accumulation time is controlled so that in each focus detection area, the photon charge may become a predetermined amount, and the magnitude of an image signal taken out at a later step becomes substantially constant irrespective of the luminance of the object.

At the next step #102, one or more focus detection areas are determined on the basis of the output of visual axis detecting means (not shown) for detecting a photographer's visual axis position, and the open F-number information of the objective lens.

When the focus detection area on the image pickup surface 30 is determined, shift is made to a step #103, where the charge accumulated in conformity with the distribution of the quantity of light of the secondary object image is read out as an image signal and is stored in the RAM.

After the reading-out of the image signal from a predetermined light receiving area has been completed, at the next step #104, the image signal is converted into a form suited for the focus detection process in accordance with the information of the focus detection optical system stored in the EEPROM. Specifically, with regard to the first focus detection system for longitudinally separating the pupil, the process of adjusting the distortion in the calculation as will be described later and the correcting process of converting the movement speed of the image resulting from defocus into a constant speed are carried out. Hereinafter, the movement speed of the image resulting from the defocus of the objective lens will be called the image deviation sensitivity.

At a step #105, the filter operation of eliminating the low frequency component of the image signal is performed.

Lastly, at a step #106, the conventional image interval detection process is effected on the image signal processed at the steps #104 and #105, and the focus state of the previously set focus detection area is detected.

The correcting process for the image signal shown at the step #104 will now be described in detail. This correcting process comprises the following two steps:

the correction of the fall of the quantity of marginal light of the focus detection optical system.

the correction of the distortion of the image and the image deviation sensitivity.

The correction of the fall of the quantity of marginal light which is the first step is the pre-process of the correction of the distortion and image deviation sensitivity effected next, and becomes necessary to detect the distance between two images highly accurately. Also, in the correction of the distortion of the image and the image deviation sensitivity, the distortions of the two images forming a pair can be made the same and further, the movement of the images resulting from the defocus of the objective lens can be uniformly converted on the signal. That is, the correction of the image deviation sensitivity can be said to be the process of virtually creating in calculation a state in which at a position on the focus detection area whereat the image moves fast with the defocus, photoelectric conversion is effected by pixels having a great pitch and at a position whereat the image moves slowly, photoelectric conversion is effected by pixels having a small pitch. At this time, at whatever position, the areas of the virtual pixels are the same.

Description will first be made of the correction of the fall of the quantity of marginal light. Photoelectrically converting the secondary object image for the same time by the use of a sensor array as shown in FIG. 11 wherein pixels of the same shape are arranged corresponds to examining light beams per unit area entering the sensor array, i.e., illuminance.

Figure 3:
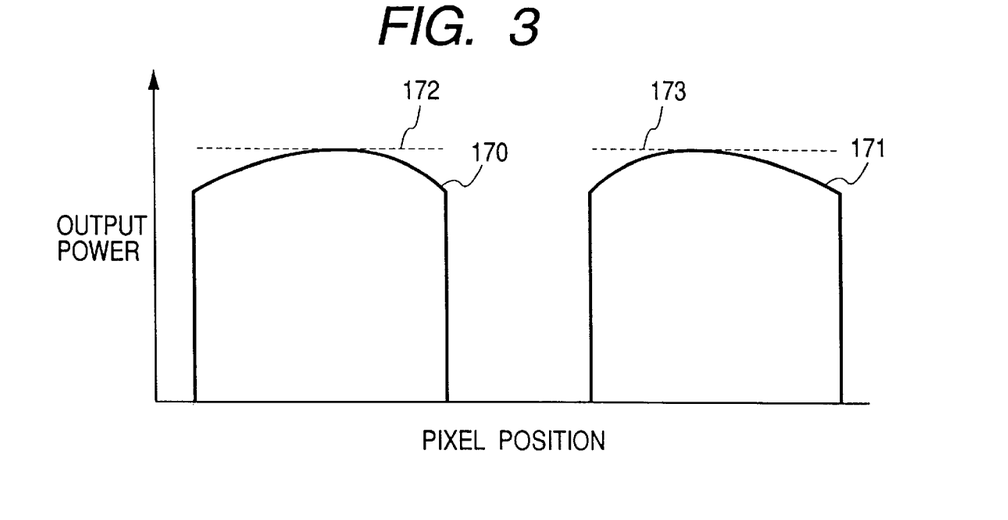
FIG. 3 shows an image signal corresponding to a uniform luminance surface obtained from a sensor array.

Generally, the illuminance of the optical image of a surface of uniform luminance is determined not by the focal length or magnification of an imaging system, but by F-number. Thinking this nature by applying it to this focus detection system, the relation between the sensor array and the stop opening with respect to a pair of re-imaging optical systems has axisymmetry and therefore, an illuminance distribution having axisymmetry is also created on the sensor array, and the distribution is determined by cosine biquadratic rule. FIG. 3 represents an image signal corresponding to a uniform luminance surface obtained from the sensor array. The axis of abscissas represents the pixel position, and the axis of ordinates represents the output power thereof, and image signals which are illuminance distributions are indicated by solid lines 170 and 171. The image signals present symmetry independently of the distortion of the secondary object image which is free of axisymmetry.

For such image signals, the correction of the fall of the quantity of marginal light of the focus detection optical system is done by multiplying the output of each pixel by the ratio between the peak value of the image signal corresponding to the uniform luminance surface and the output of each pixel, and correcting it to outputs indicated by broken lines 172 and 173 in calculation. This is because in the later correction of the distortion of the image and the image deviation sensitivity, a virtual sampling point is formed on the image pickup surface and therefore it is necessary to reproduce the quantity of light before passing through the re-imaging optical system, i.e., before the fall of the quantity of light by the cosine biquadratic rule occurs.

Figure 4:
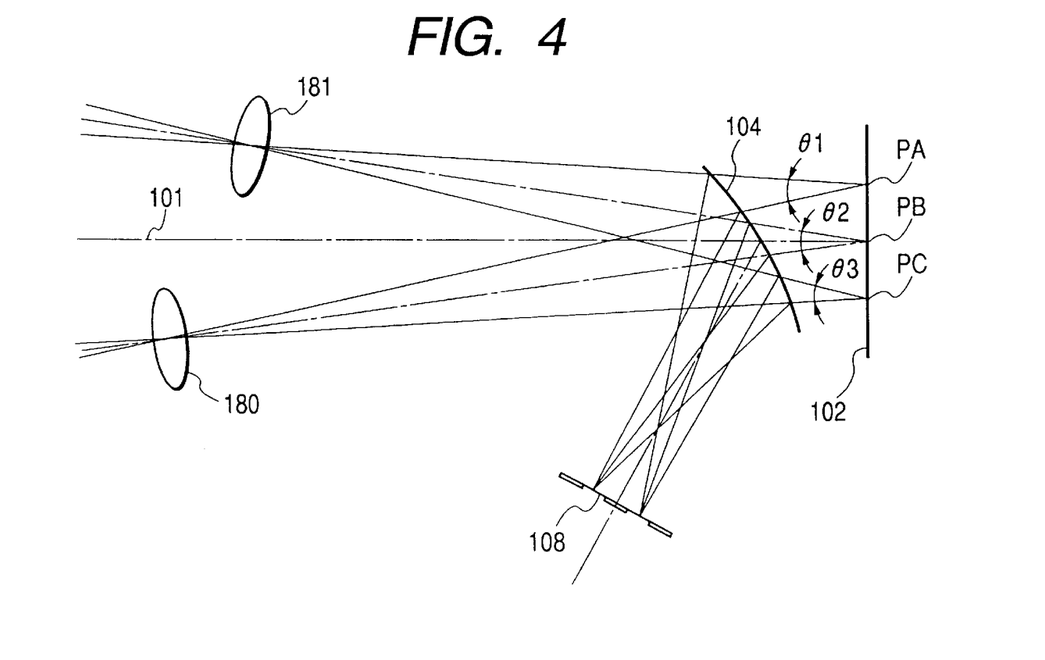
FIG. 4 is a view for illustrating the optical path of a first focus detection system in the focus detection device according to the present invention.

Description will now be made of the correction of the distortion of the image and the image deviation sensitivity. FIG. 4 is a view for illustrating the optical path of the first focus detection system. FIG. 4 depicts rays of light of the light beam arriving at the end portion of the focus detection area of the first focus detection system which pass through the centroids of the stop opening portions 108e and 108g. For the sake of simplicity, the main mirror 103 and the second reflecting mirror 106 are omitted and the optical path is developed.

Since the first reflecting mirror 104 is obliquely disposed relative to the optical axis 101 of the objective lens, the distance between the stop 108 and the first reflecting mirror 104 differs depending on their positions on the focus detection area. As previously described, the first reflecting mirror 104 has the action as a field lens, and when the stop 108 is projected on the objective lens side, the images 180 and 181 thereof become oblique as shown due to this distance difference. In other words, when points PA, PB and PC are defined on the image pickup surface 102 as shown, there is the relation that $$\theta 1 < \theta 2 < \theta 3 \tag{1}$$

among the angles θ1, θ2 and θ3 allowing for the centroids of the images 180 and 181 of the stop from these points.

That is, the parallaxes e1, θ2 and θ3 when the pupil of the objective lens is divided into two differ from one another depending on the position on the focus detection area (the position on the sensor array), and the speed at which the two images move toward and away from each other by the defocus of the objective lens is not uniform.

Moreover, the distortions of the two images are strictly not the same, but speaking with respect to the vertical direction in FIG. 9, i.e., the direction of the sensor array, the secondary object image 122g is projected larger than the secondary object image 122e. In such a state in which the sizes of the images differ from each other and the similarity of the two images is low, the detected image interval has no meaning and of course, this cannot be used for the determination of in-focus.

The correction of the distortion of the image and the image deviation sensitivity is the correction for uniformizing the sizes of the two images in the modified image signal, and further uniformizing the movement speeds of the images. For this purpose, the virtual sampling points of the two images on the primary image plane can be made the same and moreover, at this time, the image signal can be converted in calculation so that the pitch of the virtual sampling points may change in conformity with the distribution of the image deviation sensitivity.

Now, the specific signal processing will be described. First, virtual sampling points are found, and then actual sampling points are found and lastly, the correction of the image signal is effected. It is because in the portion of the correction of the image signal, the output of each pixel is handled as the representative value of the opening centroid of the pixel that the range within which photoelectric conversion is effected is expressed as a point.

In determining the virtual sampling points at first, coordinates axes optically corresponding to the image pickup surface 130 (102) and the area sensor 111 are defined, and the direction thereof is taken in the direction of the sensor array on the area sensor 111. The positional coordinates of the primary object image on the image pickup surface 130 are defined as X, and the positional coordinates of the secondary object image on the area sensor 111 are defined as x. At this time, the origins of the two coordinates axes are regarded as optically coinciding with each other, that is, the position at which the ray of light on the optical axis 101 of the objective lens has reached the image pickup surface 130 is defined as X=0, and the position of the ray of light emitted from the position X=0 and passed through the center of the stop opening portion on the area sensor is defined as x=0. Two secondary object images are formed for one position on the image pickup surface, but the process described hereinafter applies to each of the two secondary object images.

First, the distribution of the image deviation sensitivity can be represented by the following expression (2) as the quadratic function of the distance S1(J) (J being a positive number) from the origin on the area sensor 111 to be found:

$$K = k_o + k_1 \times S1(J) + k_2 \times S1(J)^2 \qquad (2)$$

where K is the image deviation sensitivity, S1(J) is the position of the virtual sampling point of the Jth pixel from the position of x=0, and $k_0$, $k_1$ and $k_2$ are coefficients representative of the distribution of the image deviation sensitivity. Also, the distribution of the ratio H of the image deviation sensitivity with the position of x=0 as the reference is $$H = \frac{K}{k_0} \qquad (3)$$

If the virtual sampling pitch on the primary image plane (the coordinates of each pixel when a virtual area sensor is projected onto the primary image plane) is in inverse proportion to the image deviation sensitivity, the movement speed of the image becomes apparently constant and therefore, the ratio H between the sampling pitch P(J) on the primary image plane and the image deviation sensitivity can have a relation like the following expression (4) with A as a constant:

$$P(J) = \frac{A}{H} \qquad (4)$$

(A is, for example, A=pp×β pp: pixel pitch β: reference magnification)

Here, for simplicity, consider an infinitely fine virtual sampling point. The distance S1 from the origin to the virtual sampling point can be represented by the addition of the pitch and therefore, with t as the divided amount of the distance S1, there is the relation that $$S1 = \int P \, dt \qquad (5)$$

Also, the sampling pitch P on the primary image plane can be rewritten as the differential form of S1 by t, like $$P = \frac{dS1}{dt} \qquad (6)$$

Accordingly, from expressions (2), (3), (4) and (6), the relation that $$\frac{dS1}{dt} = \frac{A \times k_0}{k_0 + k_1 \times S1 + k_2 \times S1^2} \qquad (7)$$

can be derived.

If under the boundary condition that S1=0 when t=0, the differential equation of expression (7) is solved and further, S1 is returned to the discrete value S1(J), the following expression is obtained:

$$S1(J) \times \left( k_0 + \frac{k_1}{2} \times S1(J) + \frac{k_2}{3} \times S1(J)^2 \right) = A \times k_0 \times t \qquad (8)$$

Lastly, if t is defined as $t = J \times t_1$ and $t_1$ of a suitable magnitude is defined and S1(J) is found with respect to each J, all the others than S1(J) become constants and therefore, a sequence of numbers ({ ... S1(−2), S1(−1), S1(0), S1(1), S1(2) ... } can be known. That is, said S1(J) is a position conforming to a pitch inversely proportional to the image deviation sensitivity on the primary image plane, and if the output of this position is taken out, the movement speed of the image can be processed as being constant. If from expression (8), $t_1$ is found as t when S1(J)=pp×β, the pitch of the actual sampling point near the origin and the pitch of the virtual sampling point become substantially equal to each other.

Next, the actual sampling point by the sensor array on the image pickup surface 130 (the actual pixel position when the area sensor is projected onto the primary image plane) is found.

X and x are in the relation that $$X = x \times (\beta \times (1 + h(x))) \qquad (9)$$

by distortion h(x) with β as the reference magnification (the magnification at x=0). Further, if the pitch of the pixels constituting the sensor array is defined as pp (constant), X(n) represented by $$X(n) = pp \times J \times (\beta \times (1 + h \, (pp \times n))) \qquad (10)$$

becomes the actual sampling point. Accordingly, it will be seen that the sampling pitch of the image on the image pickup surface calculated from expression (10) is an unequal interval due to the distortion of the secondary object image.

As previously described, the brightness of the secondary object image is determined not by the focal length, magnification, distortion, etc. but F-number of the imaging optical system. Also, the result of the secondary object image having been photoelectrically converted by pixels of an equal area represents the illuminance distribution of the image. So, if it is considered that each pixel output represents the illuminance at the centroidal position of the light receiving opening, the output of the sensor array means the illuminance of a point at which the image pickup surface is sampled at unequal intervals. Conversely speaking, it is equal to the output when pixels having openings of the same area are placed at unequal intervals.

That is, under the assumption that a change in the quantity of light between two points is linear, the illuminance at any point on the image pickup surface can be found by interpolating the outputs of the actual sampling points sandwiching that point. There is a case where between adjacent actual sampling points, e.g., X(n) and X(n+1), there are a plurality of virtual sampling points or there is a single virtual sampling point or there is no virtual sampling point, but in any case, by using the actual sampling points on the opposite sides of the virtual sampling point, higher interpolation accuracy can be expected. Also, the image signal has already been subjected to the correction of the fall of the quantity of marginal light of the focus detection optical system and therefore, there is not the evil of combining two pixel outputs by interpolation calculation.

Figure 5:
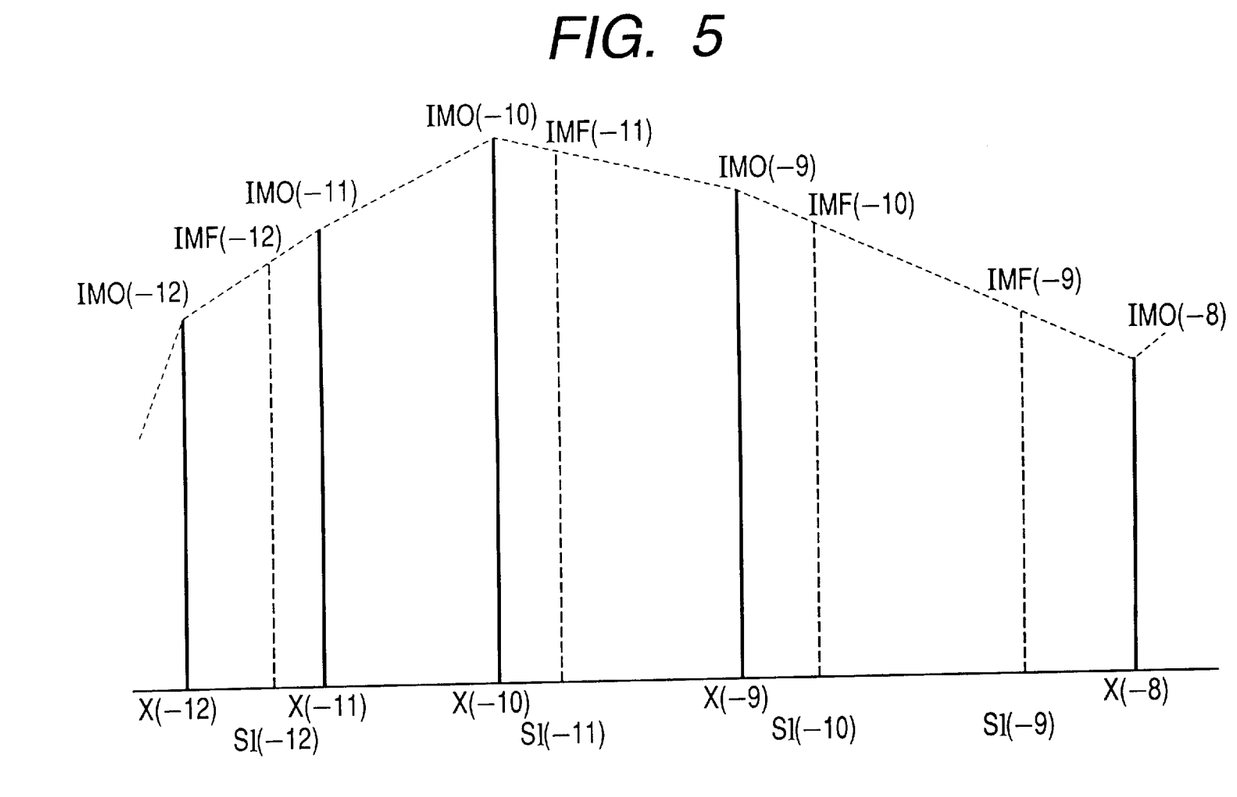
FIG. 5 is a graph for illustrating the correction of the image signal.

Reference is now had to FIG. 5 to describe the correction of the image signal. In FIG. 5, the axis of abscissas is the axis in the sensor array direction defined on the image pickup surface, and the axis of ordinates represents the pixel output. In FIG. 5, there is shown an area including actual sampling points (positions on the primary image plane corresponding to the actual pixel positions when the pixels X(J) of the sensor are projected onto the primary image plane) X(−12), X(−11), X(−10), X(−9) and X(−8) and virtual sampling points (pixel positions which should be on the primary image plane for processing the movement speed of the image as being constant) S1(−12), S1(−11), S1(−10) and S1(−9).

The fact that in FIG. 13, the sensor array projected onto the image pickup surface extends downwardly corresponds to the fact that in FIG. 5, the intervals among the actual sampling points X(−12), X(−11), X(−10), X(−9) and X(−8) extend rightwardly, and the change in the parallax represented by expression (1) corresponds to the fact that the intervals among the virtual sampling points S1(−12), S1(−11), S1(−10) and S1(−9) extend leftwardly.

As shown in FIG. 5, the position S1(J) (J being pixel No. when the pixel at the origin position is 0) corresponding to each pixel at a virtual sampling point representative of the pixel position on the primary image plane for processing the movement speed of the image as being constant and the position X(n) (n being pixel No. when the pixel at the origin position is 0) corresponding to each pixel at an actual sampling point representative of the actual pixel position on the primary image plane are not coincident with each other. Accordingly, the position S1(J) cannot be directly taken out as the pixel output at the virtual sampling point and therefore, the output at the virtual sampling point is calculated in conformity with the output from the actual sampling point from which the output of each sensor pixel can be taken out, and this output is used for correlation calculation data as the sensor output. As this specific method, there is the following method. When output calculation at the virtual sampling points S1(−12), S1(−11) and S1(−10) is to be effected, S1(−12) is calculated from X(−12) and X(−11), S1(−11) is calculated from X(−10) and X(−9), and S1(−10) and S1(−9) are calculated from X(−9) and X(−8). For example, the calculation expression about the image output of S1(−12) is $$W = \frac{S1(-12) - X(-12)}{X(-11) - X(-12)} \quad (11)$$

$$IMF(-12) = (IMO(-11) - IMO(-12)) \times W(-12) + IMO(-12) \quad (12)$$

That is, a general expression for finding an image signal IMF(J) corrected at S1(J), for n satisfying $$X(n) < S1(J) \leq X(n+1) \quad (13)$$

is $$W(J) = \frac{S1(J) - X(n)}{X(n+1) - X(n)} \quad (14)$$

$$IMF(J) = (IMO(n+1) - IMO(n)) \times W(J) + IMO(n) \quad (15)$$

In the actual processing in the focus detection device, the arrangement of W(J) by expression (14) and the correspondence relation between J and n can be pre-calculated on the basis of the distortion h(x) of the secondary object image and the image deviation sensitivity K, and the processing of expression (15) can be effected.

Also, if a term for correcting the manufacturing error of the focus detection optical system is incorporated in expression (9) for finding the actual sampling point, the correction of the distortion of the image can be effected at higher accuracy for individual products. The secondary image of the object formed on the area sensor 111 is moved by the fluctuation of the interval between a pair of lens portions on the lens block 109, but may be considered to shift from the design value with the distortion being substantially the same. Accordingly, with the movement distance of the secondary object image as δ, it is effective to rewrite the expression for finding the actual sampling point as $$X = (x - \delta) \times (\beta \times (1 + h(x - \delta)) \quad (16)$$

δ can be one of adjustment data stored in the EEPROM 164 during the adjustment of the focus detection device.

Further, the distortion of the secondary object image and the change in the image deviation sensitivity are very small in the difference between the sensor arrays and therefore, the same arrangement of W(J) and the same correspondence relation between J and n may be used.

While the correction of the distortion and the image deviation sensitivity has been described above with respect to the image signal taken out so as to include the portion between the maximum illuminance and zero level of the distribution of the quantity of light of the secondary object image, the same processing can also be applied to the image signal taken out so as to include the portion between the maximum illuminance and the minimum illuminance.

What is claimed is:

1. A focus detection device which is provided with light receiving means having a plurality of photoelectric conversion elements and signal processing means, and in which a pair of object images having a parallax are projected onto said light receiving means to thereby form a focus detection field of view for detecting the focus state of an objective lens, and detect the focus position of the objective lens by the relative positional relation between said pair of object images, a device comprising:

correcting means for correcting the outputs of said photoelectric conversion elements on the basis of the distribution of the parallax on the focus detection field of view, said signal processing means effecting the process of detecting said focus position on the basis of the outputs of said photoelectric conversion elements corrected by said correcting means.

2. A focus detection device comprising:

an optical system for causing a pair of images from different positions in a scene to be received on light receiving means having a plurality of photoelectric conversion elements with a parallax conforming to each of the positions;

determining means for determining a sampling point on said photoelectric conversion elements on the basis of the distribution of the parallax at each of said positions on said light receiving means; and detecting means for detecting the focus state at each of said positions on the basis of the output of the photoelectric conversion element corresponding to said determined sampling point.

3. A focus detection device according to claim 2, wherein said detecting means calculates the output at said sampling point from the output of one of said photoelectric conversion elements which is proximate to said sampling point, and detects the focus state on the basis of said calculated output.

4. A focus detection device according to claim 2, wherein said determining means sets the sampling pitch on said light receiving means to a pitch conforming to the distribution of the parallax at each of said positions to thereby determine said sampling point.

5. A focus detection device according to claim 2, wherein when the photoelectric conversion element at a predetermined position on said light receiving means is the origin position, said parallax has a distribution in which the parallax to the element for from said element is great or small.

6. A focus detection device according to claim 2, wherein said optical system is provided with a stop having a pair of openings for passing therethrough a light beam forming an image which is passed through an objective lens, and a pair of imaging optical systems corresponding to said stop, and causes a light beam from each position to be received as a pair of images having a parallax conforming to each position on a pair of areas conforming to each position on said light receiving means.

7. A focus detection device according to claim 6, which detects the relative positional relation between a pair of images in a pair of areas conforming to each position on the basis of the outputs from the photoelectric conversion elements in said pair of areas and wherein said determining means determines the sampling points of the outputs of said photoelectric conversion elements in conformity with the parallax at said position.

8. A focus detection device according to claim 2, wherein said determining means determines the sampling point at each position in conformity with the parallax for the element at said position so that the distribution of the parallax may become apparently constant.

9. A focus detection device which is provided with an imaging optical system for re-forming the primary object image of a light beam passed through an objective lens, and light receiving means having a plurality of photoelectric conversion elements for receiving a pair of secondary object images having a parallax from said imaging optical system, and in which for different positions in a scene, each pair of secondary object images are caused to be received on said light receiving means to detect the focus state of an area by the relative positional relation between each pair of secondary object images, said device comprising:

setting means for setting the sampling pitch or sampling point of said photoelectric conversion elements in conformity with the distribution of the movement speed of the images resulting from the defocus on the light receiving means caused by the difference between the parallaxes for the respective positions in the scene in order to correct the difference for each area in said movement speed; and processing means for carrying out a focus detecting process on the basis of the output of the photo-electric conversion element at a position corresponding to the sampling pitch or sampling point set by said setting means.

10. A focus detection device according to claim 9, wherein said setting means determines said sampling pitch or said sampling point so that the distribution of the movement speed may become apparently uniform.

11. A focus detection device according to claim 9, wherein said movement speed has such a distribution that when the photoelectric conversion element at a predetermined position in said light receiving means is the origin, the movement speed of the element at a position fur from the photoelectric conversion element at the origin position becomes higher, and the sampling pitch or sampling point at the position indicating said movement speed in conformity with the movement speed at each position is determined in conformity with the movement speed at said position.

12. A focus detection device according to claim 9, further having a stop having a pair of openings disposed in front of said imaging optical system, and wherein said imaging optical system is comprised of a pair of optical systems corresponding to said stop.

13. A focus detection device according to claim 9, wherein said processing means calculates an output at said sampling point from the output of one of said photoelectric conversion elements which is proximate to said sampling point, and carries out the focus detecting process on the basis of said output.

* * * * *

UNITED STATES PATENT AND TRADEMARK OFFICE
CERTIFICATE OF CORRECTION

PATENT NO. : 5,892,578

DATED : April 6, 1999

INVENTOR(S) : Yasuo Suda

It is certified that error appears in the above-identified patent and that said Letters Patent is hereby corrected as shown below:

Col. 4, line 21, delete "exist" and insert --exit--.

Col. 6, line 15, delete "." before object

Col. 8, line 55, delete "e1" and insert --01--.

Col. 14, line 35, Claim 1 delete "fur" and insert --far--.

Signed and Sealed this

Fifteenth Day of February, 2000

Attest:

Q. TODD DICKINSON

Attesting Officer

Commissioner of Patents and Trademarks